Patented Aug. 28, 1945

2,383,701

UNITED STATES PATENT OFFICE 2,383,701

METHOD OF MAKING BITUMINOUS MATERIALS

Walter Becker and Wilhelm Maass, Hamburg, Germany; vested in the Alien Property Custodian No Drawing. Application September 6, 1938, Serial No. 228,678. In Germany September 6, 1937

1 Claim. (Cl. 196—74)

Bitumen (petroleum asphalt) is being produced mainly by distilling asphalt-containing mineral oils to separate therefrom the constituents with a relatively low boiling point. In this way bitumens of different degrees of hardness may be obtained by means of different degrees of distillation.

The temperatures at which softening and breaking ("softening point" and "breaking point") takes place with these materials are in a definite relation to each other in a way that the breaking point is positioned the lower in the temperature scale, the lower the softening point. In case the softening point is raised in the temperature scale by more effectively distilling off the oils, the breaking point will likewise be raised in the temperature scale. Thus, for instance, a bitumen having its softening point at 35° C. (Krämer-Sarnow) will have a breaking point (Fraass) at about −20° C., while a bitumen with a softening point at 60° C. will have a breaking point at about −3° C. The temperature range between softening point and breaking point, therefore, amounts to from 55 to 65° C.

In many cases, now, it is desirable to make bitumens which although having a high softening point have a very low breaking point, which is not the case with the petroleum asphalts produced by distillation. Accordingly, bitumens with high melting points have been made by means of a process of blowing, that is by blowing air into a residue of mineral oil having, for instance, its softening point (Krämer-Sarnow) at 30° C. By this the softening point will be considerably raised, while the breaking point is not raised in like manner. A bitumen made by a process of blowing of this kind has, for instance, the following specifications:

|  | °C. |
|---|---|
| Dropping point (Ubbelohde) | 115 |
| Softening point (Krämer-Sarnow) | 84 |
| Breaking point (Fraass) | −2 |

The Ubbelohde test is described in pages 189, 190 and 210 and the Krämer-Sarnow test is described in pages 208 and 209 of "Examination of hydrocarbon oils" by Holde and Mueller, published (1915) by John Wiley & Sons, New York. The Fraass test is described in "Bitumen," volume 7, pages 152 to 155, September 1937.

The Engler viscosity of this bitumen amounts to about 1000 at 150° C. Such a bitumen, therefore, has the disadvantage that even at a high temperature it is very viscous.

Now, it has been found that bituminous materials having a high resistivity against heat as well as against cold and a relatively low viscosity value may be obtained by applying the process of blowing air not to the bitumen residue of a mineral oil of asphalt base but by using the mineral oil distillates that are free from asphalt and applying thereto the process of blowing by air.

As original materials for making bituminous materials according to this invention there may be used all viscous mineral oil distillates that are free from asphalt and originate from crude oils of asphalt base or of mixed bases. The temperatures used in the process of blowing are ordinarily within the range between 160° and 200° C., while the time during which said process is being carried out amounts to from 30 to 200 hours or more in accordance with the desired specifications of the final product.

Further details are given in the following examples:

Example 1

40 kg. of mineral oil distillate of the following specifications:

| Specific gravity | 0.956 |
|---|---|
| Flash point °C | 225 |
| Engler viscosity 50° | 10.2 | were blown at 170° to 180° C. with 74,000 liters of air, during 197 hours.

The blown mineral oil distillate was found to have the following specifications:

| Specific gravity at 15° C | 1.001 |
|---|---|
| Penetration at 15° C | 150 |
| Penetration at 25° C | 214 |
| Dropping point (Ubbelohde) °C | 119 |
| Softening point (ball and ring) °C | 94 |
| Softening point (Krämer-Sarnow) °C | 59 |
| Ductility cm | 0.5 |
| Breaking point (Fraass) °C | Below −20 |
| Engler viscosity at 150° C | 10.4 |

Remarkable characteristics are the high liquefying or dropping point, the very low breaking point and the small viscosity value at 150° C.

Example 2

8 kg. of mineral oil distillate of the following specifications:

| Specific gravity at 15° C | 0.955 |
|---|---|
| Flash point °C | 198 |
| Engler viscosity 50° C | 8.23 | were blown at from 165° to 185° C. during 71 hours together with 26,800 liters of air.

In this case a product was obtained having the following specifications:

| | |
|---|---|
| Specific gravity | 1.001 |
| Penetration at 15° C | 44 |
| Penetration at 25° C | 73 |
| Dropping point (Ubbelohde) °C | 78 |
| Softening point (ball and ring) °C | 69 |
| Softening point (Krämer-Sarnow) °C | 56 |
| Ductility at 25° C | 2.3 |
| Breaking point (Fraass) °C | Below −20 |
| Engler viscosity 100° C | 302.9 |
| Engler viscosity 125° C | 29.2 |
| Engler viscosity 150° C | 11.0 |

There is likewise remarkable in this case the low breaking point and the small viscosity value at 150° C. in connection with a very high dropping point.

If as original materials mineral oil distillates are used having a smaller viscosity value than that given in the examples, for instance a viscosity 2° (Engler) at 50° C. the blowing time must be prolonged.

The blowing process may also be accelerated by addition of known catalysts, such as for instance metal oxides and their salts and soaps. As catalysts come into consideration naphthenates, sulphonates, stearates and resinates of copper, lead, manganese, cobalt, iron and chromium. The catalysts to be added amount to from 0.01 to 0.3 percent.

The final products may be used as adhesive compounds, saturants and the like in the roofing felt industry, paper-industry, cable-industry as well as binders for the construction of roads, for instance, as a medium for filling joints. These products furthermore may be useful in the manufacture of putties for earthenware pipes, glazier-putties and special putties by incorporating an alkaline earth and forming alkaline earth soaps by a process of saponification, at the same time adding eventually filling materials. For this purpose, furthermore, proper filling materials may be incorporated; thus, for instance a bituminous putty may be of the following composition:

Example 3

| | Per cent |
|---|---|
| Blown asphalt according to Example 1 | 49 |
| Heavy gasolene | 1 |
| Slag-wool | 3 |
| Powdered limestone | 30 |
| Kieselguhr | 17 |
| Total | 100 |

Besides, from the bituminous materials made according to this invention, masses for filling up joints may be obtained, which masses are but little sensitive against the influence of temperature. In this case also alkaline earths may be incorporated and alkaline earth soaps obtained by means of a process of saponification and eventually also proper fillers, such as powdered slate, asbestos fibers, slag-wool and the like may be added. It will furthermore be possible to use for this purpose soft bitumen and proper fillers as addition. A mass of this kind for filling-up joints may be composed as follows:

Example 4

| | Parts by weight |
|---|---|
| Mineral oil bitumen | 40 |
| Blown bitumen according to Example 1 or 2 | 40 |
| Slag-wool | 10 |
| Powdered slate | 10 |

In order to make lubricating products for hot and cold rolling mills, the bituminous materials produced according to this invention may be saponified with fixed alkalies or with alkaline earths or mixtures of both of these alkalies.

Example 5

100 parts by weight of blown asphalt made according to Example 1 are saponified with 4 parts of a 50 percent milk of lime. The dropping point of the asphalt has in this case been as high as at 142° C.

Example 6

100 parts by weight of blown asphalt made according to Example 2 are saponified with 4 parts of a 50 percent milk of lime. The dropping point will in this case be at 118° C. and accordingly has been raised by 40° C. in the temperature scale.

A further field of application of the bituminous materials made according to this invention consists in their use as a filling mass for cables. In this case the products made in accordance with the examples given hereinabove may be immediately used.

The new bituminous materials may further be used as an insulating material for cables as well as an adhesive compound for paper and as a saturant for roofing felts. For this purpose the oxidation of the mineral oil distillates that are free from asphalt is carried through only until the desired consistency is obtained. The thus produced bituminous materials are likewise distinguished by the large temperature range between the dropping point (Ubbelohde) and the fracture point (Fraass). The use of the new bituminous materials as a saturant for crude roofing felt will be essentially facilitated by reason of the small viscosity value of the artificial asphalt, as compared with an ordinarily used bitumen at the same temperature. Therefore, especially papers for cables, bituminous roofing felt and the like may be made according to this invention.

The new bituminous materials may finally be used for making high grade asphalts by mixing natural asphalt or mineral oil asphalt with these new bituminous materials. It will thus be possible to considerably improve the natural asphalts and mineral oil asphalts as regards their plasticity and resistivity against cold. Eventually the mixtures consisting of natural asphalt or mineral oil asphalt and of the new bituminous materials may again be subjected to a short process of oxidation.

We claim:

A process for the preparation of bituminous materials having a high resistivity against heat and cold and a low viscosity adapted for use as binders, saturants, and adhesive compounds, which comprises blowing a distillate free from asphalt derived from an asphalt-containing crude with air at a rate of about 376 liters per hour per 40 kilograms and a temperature between 160° C. and 200° C. for a period of 30 to 200 hours and sufficient to form a bituminous asphalt product having a temperature difference between the softening and breaking point of at least 75° C. and an Engler viscosity at 150° C. of about 10.

WALTER BECKER.
WILHELM MAASS.